Dec. 10, 1929.                C. G. FINK ET AL                1,738,991
             MANUFACTURE OF DOUBLE WALLED VACUUM RECEPTACLES
                           Filed Nov. 24, 1925
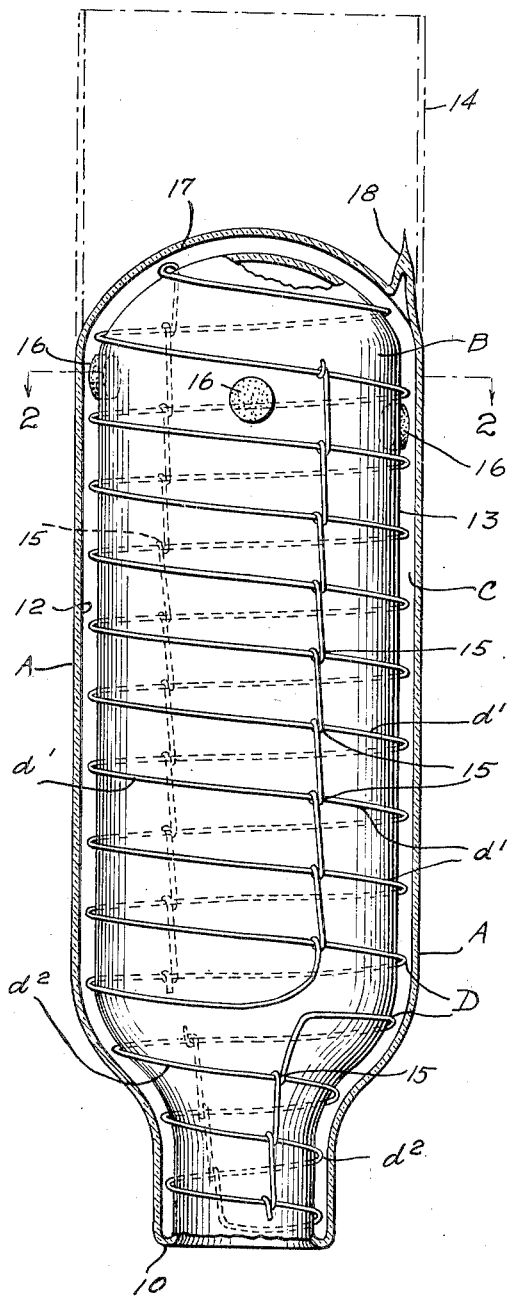
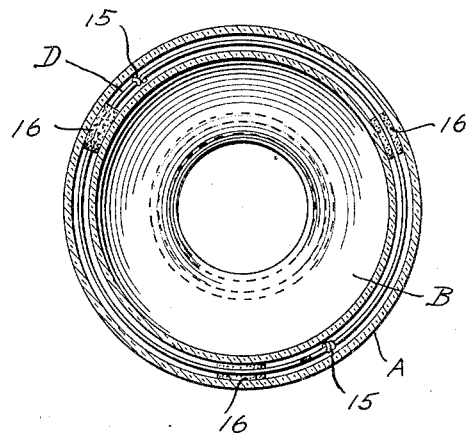
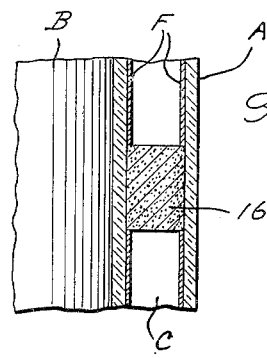
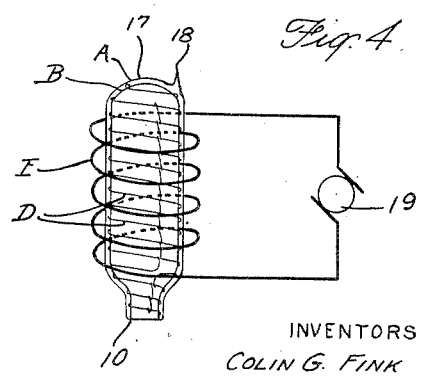
INVENTORS
COLIN G. FINK
JOHN R. BEERS
BY
Adolph A. Thomas
ATTORNEY Patented Dec. 10, 1929

1,738,991

UNITED STATES PATENT OFFICE

COLIN G. FINK AND JOHN R. BEERS, OF NEW YORK, N. Y., ASSIGNORS TO THE AMERICAN THERMOS BOTTLE COMPANY, OF NORWICH, CONNECTICUT, A CORPORATION OF MARYLAND

MANUFACTURE OF DOUBLE-WALLED VACUUM RECEPTACLES

Application filed November 24, 1925. Serial No. 71,207.

Our invention relates generally to the manufacture of vacuum vessels of the well-known double-walled type employing two containers spaced by an annular vacuum chamber. These containers are usually of glass, and the inside walls of the vacuum chamber are silvered to prevent loss of heat by radiation from the contents of the inner container. It is the object of our invention to provide novel methods and means for coating the double walls of the vacuum chamber with a metallic mirror-like surface.

In the manufacture of vacuum bottles of the type referred to, the process of silvering heretofore employed is a wet process and consists in depositing a silver coating on the glass walls by precipitation from a solution of silver nitrate, pumping out the remaining solution, and thoroughly rinsing the silvered surfaces with cold water. The bottle then must be baked in an oven for several hours to give the silver a permanent set and to dry the silvered chamber as much as possible before evacuating the same. These operations require a silvering department and a drying department. Now, while the baking does set the precipitated silver, it does not remove all moisture from the chamber, owing to the constricted tubular path through which the steam must slowly escape. The presence of moisture in the space to be evacuated has always been the cause of serious troubles and difficulties in the manufacture of vacuum bottles. It has been absolutely impossible, under this wet silvering process, to get rid of all moisture in the vacuum chamber, because this moisture clings tenaciously to the precipitated silver, particularly in corners and crevices where the precipitation is thick, and it also gets into the asbestos spacing pads arranged between the two containers. Asbestos being fibrous, moisture remains occluded in these pads even after the long baking operation. So that, the presence of moisture in the vacuum space must always be reckoned with during these vacuum operations. This moisture interferes with securing a proper degree of vacuum and thereby greatly reduces the heat-insulating efficiency of the bottle. Moreover, moisture in the evacuated space gets into the exhaust pumps and makes frequent cleaning of the same necessary. Also, it is a common experience that the presence of moisture in the vacuum chamber frequently causes the bottles to break. Then, too, the silver solutions are expensive. Obviously, all these factors in the prior "wet silvering" process considerably increase the cost of producing the glass "fillers" of vacuum bottles.

It is the purpose of our invention to overcome the foregoing difficulties and objections inherent in the prior methods of wet-silvering vacuum bottles by means of a dry silvering process which is quick, cheap, clean and efficient in producing the required metallic coating on the inside walls of the vacuum chamber. To this end, we arrange a closed coil or cage, as it may be called, of a suitable volatile metal around the inner container in the chamber to be evacuated. As a practical example of such a metal, we may mention magnesium, which we have successfully employed. The bottle, with the volatile wire properly arranged in the annular space between the two containers, is then heated to a high temperature and simultaneously evacuated to the required degree. Surrounding the bottle is a high-frequency coil, which induces secondary currents in the closed wire in the vacuum chamber, and the heat generated by these induced currents volatilizes the metal of the wire, causing the same to be deposited on the surrounding walls as a uniform mirror-like coating. This deposition of the metal may occur while the bottle is still connected to the exhaust pump or after the evacuated chamber is sealed. It requires only a few seconds to heat the wire to vaporization temperature, and the metallic coating thus produced is instantly permanent without the need of further treatment. The process being entirely dry, all previous difficulties due to the presence of moisture are completely eliminated.

In order that those skilled in this art may understand our invention fully and clearly, we shall describe a preferred form of procedure in carrying our ideas into effect, without intending the described details as limitations of our invention. Although our new silvering process is independent of any particular apparatus, the diagrammatic illustrations in the accompanying drawings will be helpful in explaining the invention and its advantages. In these drawings—

Fig. 1 shows a double-walled glass filler, partly in section, containing a coil or cage of mirror-forming wire in the annular chamber between the two containers;

Fig. 2 is a cross-section on line 2—2 of Fig. 1;

Fig. 3 is a fragmentary view on an exaggerated scale to indicate roughly how the spacing pads between the two containers are held in place by the metallic coating; and Fig. 4 illlustrates in a diagrammatic way how the bottle is surrounded by a high-frequency coil to vaporize the wire inside the vacuum chamber.

In an ordinary vacuum bottle, there is an outer metal casing which contains a glass filler, as it commonly is termed. Such a filler is shown in Fig. 1, where A represents the outer container and B the inner container which holds the liquid or food to be kept hot or cold. It has been customary to blow these containers as separate cylinders, which are later united by fusing them together around the neck, as indicated at 10. The two containers are separated by an annular chamber C of practically uniform width. This chamber is subsequently exhausted and thus forms a heat-insulating vacuum space around the inner container, thereby retaining the contents of the bottle for a considerable time at the temperature at which they were put in. In order to prevent, or at least minimize, loss of heat from the inner container by radiation across the vacuum space, manufacturers of vacuum bottles have for many years silvered the inner surface of the outer container and the outer surface of the inner container. These bright mirrored walls reflect radiant heat rather than absorb or transmit it. The wet precipitation process heretofore employed in silvering the walls of the vacuum space has already been mentioned, and we shall now describe in detail our new process for depositing a mirror coating on the surfaces 12 and 13 of vacuum chamber C.

While the outer cylinder A is still open at the base, as roughly indicated by dotted lines 14, we insert into space C as closed coil or basket D of a suitable volatile metal, so arranged as to extend practically along the entire length of the inner container. In our experiments we secured very satisfactory results with a pure magnesium wire of from 20 to 35 mils in diameter, with the turns about one-half inch apart. The ends of the coil are preferably connected to the different turns, as shown at 15, to provide in effect a plurality of short-circuited coils for a purpose that will appear later. The wire cage or basket D is shown in Fig. 1 as formed in two sections, a main section $d^1$ and a neck section $d^2$. This is merely for the mechanical convenience of inserting the cage into the vacuum chamber. The neck section $d^2$, which consists of a few turns of wire, is placed around the neck of the inner container before the two cylinders are fused together at 10. After the two containers have been joined at the neck into a unit, with the coil section $d^2$ in place, and while the outer member A is still open at the base, the main coil section $d^1$ is slipped over the inner member B. We obtained the best results by forming the wire cage D of such a size that the turns fit loosely over the inner container and lie between the adjacent surfaces 12 and 13. This spacing of the wire not only makes it easy to slip the cage or basket in place, but it seems to cause a more uniform coating of magnesium on the surrounding walls. At least, such has been our experience, but we want to make it plain that our invention is not limited in this particular.

After the cage D has been partially inserted over the inner container B, suitable spacing pads 16 are placed on the inner container between the turns of wire. As the cage is then pushed in completely, the pads 16 are carried along into the chamber C, as indicated in Fig. 1. These spacing pads are preferably of heat-insulating and shock-absorbing material (e. g., asbestos), and are properly spaced around the annular chamber C to support the inner container laterally against shocks and strains.

After the cage D has been properly inserted into chamber C, the bottom 17 is formed on the outer container A. The assembled bottle is now suitably supported for the exhausting and silvering operations. As no special form of support is necessary, we need not show or describe this detail. In practice we found it convenient to support the bottle at the neck in upright inverted position. By means of a tubular extension 18, the bottle is connected to a suitable exhaust pump, as will be understood without further explanation. The bottle is surrounded by a primary coil E connected with a source of high-frequency currents, as diagrammatically indicated at 19, which is intended to represent any practical apparatus for generating alternating currents of high frequency. By way of example, we might mention that we have used a circuit employing the standard 50-watt pliotron power tubes as an oscillation control, and we have also used a circuit with a series of spark gaps and condensers to obtain high frequencies.

We shall now suppose that the completely assembled filler is properly supported within the primary coil E and is connected to a vacuum pump. External heat is now applied to the bottle so as to heat the same to the highest temperature which the glass will safely stand under pressure. The exhausting operation is carried on while the glass is maintained at high temperature, which is ordinarily around 400° C., until the desired degree of vacuum in chamber C has been obtained. The condition of the vacuum may be tested in any practical way, as by means of a high-tension brush discharge. When, by this test, no visible discharge can be noticed through the space C while under evacuation, the external heating is discontinued and the circuit through coil E is closed. At this time, the bottle may remain attached to the pump, or the vacuum in chamber C may be sealed. Within a few seconds, after the high-frequency coil E is connected in circuit, the coil D in the vacuum chamber becomes so highly heated by the induced secondary currents therein that the metal of the wire vaporizes and sublimes, being deposited on the surrounding walls 12 and 13 in a substantially uniform coating. When magnesium is used for the wire of coil D, the metallic coating thus formed is a bright silvery mirror-like surface. In fact, it is very difficult to distinguish this magnesium mirror from one of pure silver. In Fig. 3, the deposited metal coating is indicated at F with exaggerated thickness. By forming and arranging the volatile coil D in such a way that the turns of wire extend practically over the full length of chamber C, the volatilized metal is distributed over the entire inner walls of the vacuum chamber, covering them completely (or practially so) with a clear metallic mirror of approximately uniform thickness. This mirror remains permanently fixed on the glass without further treatment. If the bottle is left connected to the exhaust pump during the heating of coil D by inductive action from primary coil E, the bottle is sealed when the mirror has been formed.

After the wire cage D has been partially or completely dissipated and transformed into a mirror, the pads 16 are held in place by the surrounding layer of deposited metal. This will be understood from Fig. 3. Even though the coating F is very thin, it nevertheless has appreciable thickness and serves to retain the pads 16 against displacement by ordinary shocks or jars. The metallic mirror does not cover the small round areas where the pads 16 press against the glass, but that does not interfere with the usefulness of the mirrored surfaces. Hence, when we refer to the deposited coating as completely covering the walls of the vacuum chamber, allowance must be made for the spacing pads and for such irregularities as may occur in the mirrored surface in spite of all precautions. In processes of this nature, it is not always possible in practice to obtain perfect results even under the best conditions.

Instead of using separate pads 16 placed between the turns of wire coil D, we may use spacers in the form of beads or buttons of magnesium (or similar metal) strung directly on the wire. After the deposit of the volatile wire on the vacuum walls, these spacing beads are held securely in position by the mirror surfaces F, like the pads 16 in Fig. 3. By coating the metal spacing beads with a film of oxide, it is possible to reduce their heat conductivity to such an extent as to minimize loss of heat due to conduction from the inner to the outer container.

The shape of the wire cage D will obviously depend upon the particular size and shape of the bottle. At the present time we prefer to make this coil with the cross-connections 15, because this construction provides a plurality of short-circuited turns or windings which facilitate and make more uniform the heating of the cage by the induced secondary currents. This will be understood by those who are familiar with the action of high-frequency currents in closed conductors. By rapidly and uniformly heating the wire cage D to its vaporization temperature, the metal is distilled and deposited on the walls of the vacuum chamber in a clear bright mirror.

The heating coil E should be of such length and diameter that the induced magnetic field will have its greatest strength in those regions where it is cut by the wire cage D, so that the secondary currents in coil D will produce maximum heating effect. Precaution must be taken not to vaporize the metal of coil D too rapidly, as this would cause a dull plating on the glass due to the deposit of relatively large particles of metal instead of a finely divided metallic vapor or dust.

The high heat applied to the bottle during the exhausting operation drives all the occluded gases out of the glass and these are removed, as far as possible, by the exhaust. The remaining small quantity of residual gases is eliminated by chemical combination with the vaporized metal.

Since our silvering process is carried out dry, the difficulties due to the presence of moisture in the old wet silvering process are entirely eliminated by our invention, in which the formation of the vacuum and the silvering are (or may be) carried out simultaneously. Whereas the old process required hours for silvering each bottle (including the necessary baking), our dry silvering process takes only a few minutes—the actual heating of the silvering cage requires only a few seconds. Another advantage is the low cost of magnesium as compared with silver. Therefore, the important practical results of our invention are—first, a material reduction in the manufacturing cost of the completed filler; second, a more efficient bottle on account of the better vacuum obtainable.

Although we have specifically mentioned the metal magnesium for the coating coil D, other volatile metals or alloys may be used, and our invention is not limited to any particular metal, unless otherwise stated in the claims. Generally speaking, metals suitable for use in our new process and product should have a melting point higher than the softening or working temperature of the particular glass used. Also, these metals should preferably have a low volatilization point in vacuum—that is, a temperature not far above the melting point of the metal. The following metals are applicable, but are too costly for ordinary commercial bottles: gold, silver, barium, calcium, cerium, germanium. Antimony may be used, but is brittle and rather hard to handle. Metals which have too low a melting point to suit present methods of hot exhaust, but which are suitable for cold exhaust are: zinc, cadmium, lead, bismuth, thallium.

The metal sodium might be used, as its melting point is 97.6° C., less than three degrees below the boiling point of water. Usually hot liquids, such as coffee or tea, when poured into the bottle, are at a lower temperature than 100° C. In distilling a metal such as sodium into the comparatively cooler space between the two containers, the sodium is placed in a separate small retort in direct communication with the evacuated space.

The following metals have too high a boiling point in vacuum for practical purposes at the present time, but they can be used with certain precaution, such as close spacing of extremely fine wires; copper, aluminum, nickel, cobalt, tungsten, molybdenum, tantalum, etc. We have produced very fine mirrors of copper, nickel and tungsten.

It will be clear from the preceding explanation and description that the dry silvering process of our invention possesses many material advantages over the old wet method and produces a better and cheaper bottle. In its practical application, the basic principle of our invention is susceptable of changes and modifications in details of procedure, and the specific description heretofore given is not to be regarded in a restrictive sense.

When we specify magnesium in the claims, we include pure magnesium and magnesium alloys.

What we claim as our invention is:

1. In the manufacture of vacuum receptacles in which an inner and an outer container of glass are spaced by a vacuum chamber, the process of coating the walls of said chamber with a mirror-like surface adapted to minimize the loss of radiant heat from the inner container, which comprises vaporizing a closed metallic conductor within a vacuum chamber by heat generated inductively in said conductor by an electric circuit outside of said chamber, said conductor being so arranged in said chamber that the vaporized metal is deposited on the surrounding glass walls in a substantially uniform mirror-like film.

2. In the manufacture of vacuum receptacles in which an inner and an outer container of glass are spaced by a vacuum chamber, the process of coating the walls of said chamber with a mirror-like surface adapted to minimize the loss of radiant heat from the inner container, which comprises vaporizing a closed conductor of magnesium within a vacuum chamber by heat generated inductively in said conductor by an electric circuit outside of said chamber, said conductor of magnesium being so arranged in said chamber that the vaporized metallic magnesium is deposited on the surrounding glass walls in a substantially uniform mirror-like film.

3. In the manufacture of vacuum receptacles in which an inner and an outer container of glass are spaced by a vacuum chamber, the process of coating the walls of said chamber with a mirror-like surface adapted to minimize the loss of radiant heat from the inner container, which consists in placing a coil of metallic wire around the inner container, said wire being closed upon itself to form a short-circuited secondary coil of one or more turns, exhausting the space or chamber between the two containers to the required vacuum, and inductively subjecting said wire coil in the evacuated chamber to the action of high-frequency currents generated in an electric circuit outside of said vacuum chamber until the metal of the wire is vaporized and deposited on the surrounding walls in a substantially uniform mirror-like film.

4. In the manufature of vacuum receptacles in which an inner and an outer container of glass are spaced by a vacuum chamber, the process of coating the walls of said chamber with a mirror-like surface adapted to minimize the loss of radiant heat from the inner container, which consists in placing a coil of magnesium wire around the inner container, said wire being closed upon itself to form a short-circuited secondary coil of one or more turns, exhausting the space or chamber between the two containers to the required vacuum, and inductively subjecting said wire coil in the evacuated chamber to the action of high-frequency currents generated in an electric circuit outside of said vacuum chamber until the magnesium of the wire is vaporized and deposited on the surrounding walls in a substantially uniform mirror-like film.

5. In the manufacture of vacuum receptacles in which an inner and an outer container of glass are spaced by a vacuum chamber, the process of coating the walls of said chamber with a mirror-like surface adapted to minimize the loss of radiant heat from the inner container, which comprises inductively subjecting a closed metallic coil in said vacuum chamber to the action of high-frequency currents generated in an electric circuit outside of said vacuum chamber until the metal of the coil is vaporized and deposited on the surrounding walls in a mirror-like film.

6. In the manufacture of vacuum receptacles in which an inner and an outer container of glass are spaced by a vacuum chamber, a closed coil of metallic wire surrounding the inner container in said vacuum chamber, and electric means wholly outside the vacuum chamber for heating said wire by induced currents until the metal thereof is vaporized and deposited on the surrounding glass walls as a mirror-like surface.

7. In the manufacture of vacuum receptacles in which an inner and an outer container of glass are spaced by a vacuum chamber, a closed coil of magnesium wire surrounding the inner container in said vacuum chamber, and electric means wholly outside the vacuum chamber for heating said wire by induced currents until the magnesium is vaporized and deposited on the surrounding glass walls as a mirror-like surface.

8. In the manufacture of vacuum receptacles in which an inner and an outer container of glass are spaced by a vacuum chamber, a cage or basket of metallic wire surrounding the inner container in said chamber, said wire cage comprising a plurality of short-circuited secondary coils, a primary coil surrounding the outer container, and means for passing high-frequency currents through said primary coil to heat the wire of said secondary coils until the metal thereof is vaporized and deposited on the surrounding walls as a mirror-like surface.

9. In the manufacture of vacuum receptacles in which an inner and an outer container of glass are spaced by a vacuum chamber, a coil of metal wire in said chamber arranged to surround the inner container along practically its full length, a portion of the wire of said coil extending across the turns thereof and being connected to said turns so as to provide in effect a plurality of short-circuited secondary coils, and means outside of the vacuum chamber for subjecting said wire coil or coils to the action of high-frequency currents for vaporizing the metal of the wire and depositing the same on the surrounding walls in a substantially uniform film.

10. As a new article of manufacture, a double-walled vacuum receptacle in which the walls of the vacuum chamber between the inner and outer glass containers are provided with a metallic film formed by the condensation of metal vapor produced by the action of high-frequency currents, said film uniformly coating said walls as a mirror-like surface adapted to prevent the entrance of radiant heat into said chamber.

11. As a new article of manufacture, a double-walled vacuum receptacle in which the walls of the vacuum chamber between the inner and outer glass containers are provided with a film of magnesium uniformly coating said walls as a mirror-like surface adapted to prevent the entrance of radiant heat into said chamber, said film of magnesium being formed by the condensation of vapor produced by the action of high frequency currents on a magnesium wire or strip.

12. In the manufacture of vacuum receptacles in which an inner and an outer container of glass are spaced by a vacuum chamber, a closed coil of metallic wire surrounding the inner container in said vacuum chamber, spacing members for holding the free end of the inner container firmly spaced from the outer container, and electric means outside of the vacuum chamber for vaporizing the metal of said wire and depositing the same on the surrounding walls as a mirror-like surface, said spacing member remaining in self-supporting position after the sublimation of the metal wire.

13. In the manufacture of vacuum receptacles in which an inner and an outer container of glass are spaced by a vacuum chamber, a closed coil of metallic wire surrounding the inner container in said vacuum chamber, beads of soft metal superficially oxidized strung on said coil for holding the free end of the inner container firmly spaced from the outer container, and electric means for vaporizing the metal of said wire and depositing the same on the surrounding walls as a mirror-like surface, said metal beads being held in spacing position by the deposited metal surrounding them.

14. As a means for depositing a substantially uniform mirror-like surface of metal on the glass walls of the vacuum chamber in a double-walled vacuum receptacle by the vaporizing action of high frequency currents on a metal, a coil of wire adapted to be inserted in said chamber around the inner container, said coil consisting of a plurality of turns which are short-circuited by a portion of the wire extending across the turns and being connected thereto, whereby said coil becomes in effect a plurality of short-circuited coils.

15. The process of coating the surface of a glass container with a substantially uniform mirror-like film of metal, which comprises arranging a closed coil of wire of the desired metal closely along the surface to be coated, evacuating the space containing the coil and the surface to be coated, and subjecting said closed coil inductively to the action of high-frequency currents generated in an electric circuit outside of said vacuum space for vaporizing the metal of said wire and thereby depositing the same on said glass surface as a metallic mirror.

16. In the art of forming metallic mirror-like films on glass containers, a closed coil of metal wire arranged closely over the surface to be mirrored, means for evacuating the space containing said coil and said surface to the required degree, and means wholly outside of said evacuated space for electrically heating said coil by induction until the metal of the wire is vaporized and deposited on the glass surface in a substantially uniform metallic mirror.

17. In the manufacture of vacuum receptacles in which an inner and an outer container of glass are spaced by a vacuum chamber, the process of coating the walls of said chamber with a mirror-like surface adapted to minimize the loss of radiant heat from the inner container, which comprises subjecting vaporizable metal with said vacuum chamber to heat generated by an electric circuit outside of said chamber until the metal is vaporized and deposited in the surrounding glass walls in a substantially uniform mirror-like film.

18. In the manufacture of vacuum receptacles in which an inner and an outer container of glass are spaced by a vacuum chamber, the process of coating the walls of said chamber with a mirror-like surface adapted to minimize the loss of radiant heat from the inner container, which comprises exhausting said chamber while maintaining the glass receptacle at a high temperature below the softening point of the glass, and vaporizing a closed metallic conductor within the evacuated chamber by heat generated inductively in said conductor by an electric circuit outside of said chamber, said conductor being so arranged that the vaporized metal is deposited on the surrounding glass walls in a substantially uniform mirror-like film.

19. In the manufacture of double-walled glass vacuum bottles comprising two spaced containers, means for exhausting the annular chamber between the containers while maintaining the bottle at a high temperature below the softening point of the glass, a closed coil of a vaporizable metal arranged in said chamber so as to extend practically over the entire inner container, and a source of electric energy outside of said chamber for inductively heating said coil until the metal thereof is vaporized and deposited as a mirror on the surrounding glass walls.

COLIN G. FINK.
JOHN R. BEERS.